United States Patent
Gebert et al.

(10) Patent No.: US 12,519,293 B2
(45) Date of Patent: Jan. 6, 2026

(54) METHOD FOR PRODUCING AN ABLATED WIRE

(71) Applicants: Heraeus Deutschland Gmbh & Co. KG, Hanau (DE); Heraeus Medical Components LLC, St. Paul, MN (US)

(72) Inventors: Jörg-Martin Gebert, Hanau (DE); Paul Schuster, St. Paul, MN (US); Yang Yu, Singapore (SG); Thomas Lauinger, Hanau (DE)

(73) Assignees: Heraeus Medical Components LLC, St. Paul, MN (US); Heraeus Medevio GmbH & Co. KG, Hanau (DE)

( * ) Notice: Subject to any disclaimer, the term of this patent is extended or adjusted under 35 U.S.C. 154(b) by 1024 days.

(21) Appl. No.: 17/519,170

(22) Filed: Nov. 4, 2021

(65) Prior Publication Data
US 2022/0140580 A1    May 5, 2022

Related U.S. Application Data

(60) Provisional application No. 63/109,655, filed on Nov. 4, 2020.

(51) Int. Cl.
| | |
|---|---|
| *H02G 1/12* | (2006.01) |
| *B23K 26/36* | (2014.01) |
| *H01B 1/02* | (2006.01) |

(52) U.S. Cl.
CPC ............. *H02G 1/128* (2013.01); *B23K 26/36* (2013.01); *H01B 1/02* (2013.01)

(58) Field of Classification Search
CPC .... H02G 1/128; B23K 26/36; B23K 2101/32; H01B 1/02
See application file for complete search history.

(56) References Cited

U.S. PATENT DOCUMENTS

| | | | |
|---|---|---|---|
| 6,509,547 B1 | 1/2003 | Bernstein et al. | |
| 2002/0045811 A1* | 4/2002 | Kittrell | G02B 6/4296 606/7 |

FOREIGN PATENT DOCUMENTS

| | | |
|---|---|---|
| CN | 201805182 | 4/2011 |
| CN | 205355698 | 6/2016 |
| WO | 2020/098876 | 5/2020 |

OTHER PUBLICATIONS

James H. Brannon et al., "Pulsed laser stripping of polyurethanecoated wires: A comparison of KrF and CO2 lasers", Journal of Applied Physics, Oct. 1991.

(Continued)

*Primary Examiner* — Robert G Bachner
(74) *Attorney, Agent, or Firm* — Dicke, Billig & Czaja, PLLC

(57) ABSTRACT

One aspect pertains to a method for producing an ablated wire, including providing a coated wire having a circumference and a length. The coated wire has a core, an outermost coating layer, and an outer surface. The outermost coating layer at least partially surrounds the core. A plurality of laser beams are provided. The coated wire and the plurality of laser beams are arranged with respect to each other. At least two of the plurality of laser beams are arranged at different angular positions with respect to the circumference of the coated wire. The outermost coating layer is at least partially removed by moving at least one of the plurality of laser beams with respect to the coated wire to obtain the ablated wire. At least two of the plurality of laser beams are independent of each other.

19 Claims, 6 Drawing Sheets

(56) References Cited

OTHER PUBLICATIONS

F. Barnier et al., "Fibre optic jacket removal by pulsed laser ablation", Department of Physics, Dec. 1999.

\* cited by examiner

100

101

102

200

300

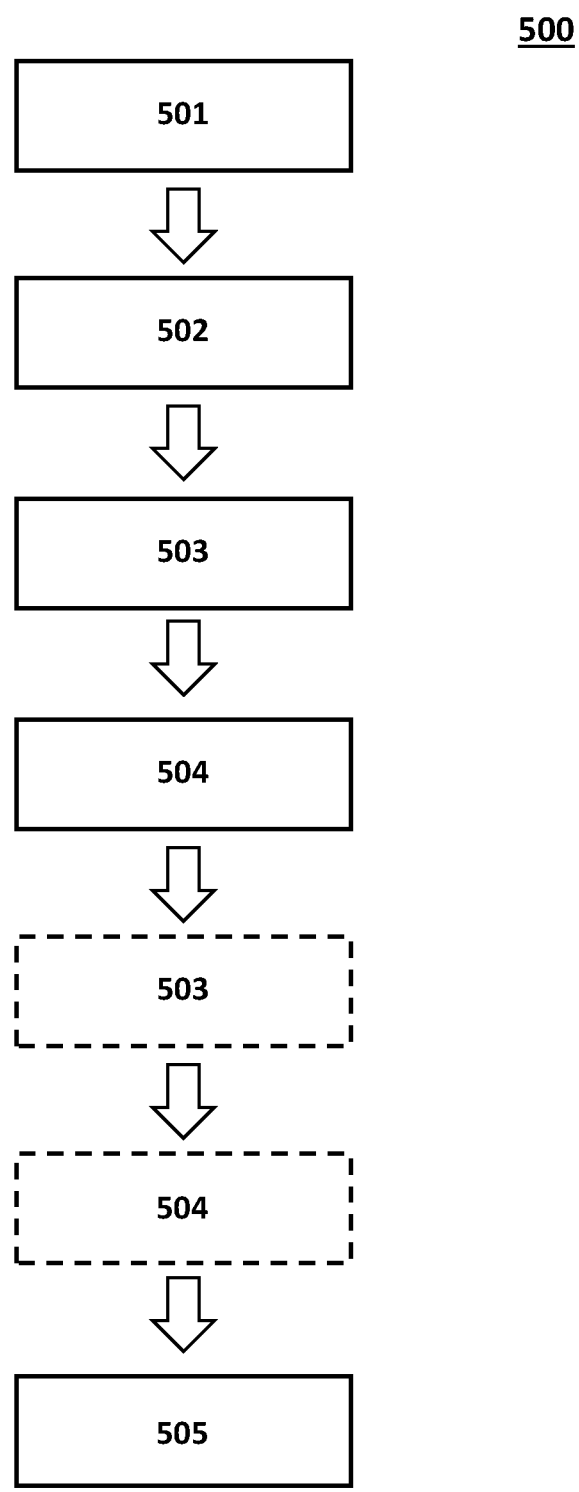

METHOD FOR PRODUCING AN ABLATED WIRE

CROSS-REFERENCE TO RELATED APPLICATION

This application is a Non-Provisional of U.S. application Ser. No. 63/109,655, filed Nov. 4, 2020, which is herein incorporated by reference.

TECHNICAL FIELD

One aspect pertains to a method for producing an ablated wire, wherein the method includes
A.] providing a coated wire having a circumference and a length, and wherein the coated wire includes
 i. a core, and
 ii. an outermost coating layer, wherein the outermost coating layer at least partially surrounds the core,
 iii. an outer surface;
B.] providing a plurality of laser beams;
C.] arranging the coated wire and the plurality of laser beams with respect to each other, wherein at least two of the plurality of laser beams are arranged at different angular positions with respect to the circumference of the coated wire;
D.] at least partially removing the outermost coating layer by moving at least one of the plurality of laser beams with respect to the coated wire;
E.] obtaining the ablated wire;
wherein,
 at least two of the plurality of laser beams are independent of each other.

BACKGROUND

Ablated wires are often used in applications such as electrochemical sensors. Ablated wires are often used in medical devices that are used for measuring, such as blood glucose monitors. It is therefore very important that the ablated wires have a low failure rate, and that the ablated wires enable the taking of very high-precision measurements.

Ablated wires are produced from coated wires. The coated wires generally have a core including a metal, generally at least one intermediate coating layer including a polymer, and generally an outermost coating layer including an organic material and a metal. Furthermore, the coated wires are often very thin, e.g., 100 mm. Producing ablated wires from coated wires often includes high-precision laser ablation of either the outermost coating layer, or the at least one intermediate coating layer, or both, thereby obtaining an ablated wire.

Ablated wires used for different purposes have very different requirements with regards to the coating layers that are removed, e.g., different ablation patterns, the thickness of the coating layers that are removed, and the number of coating layers that are removed. It can thus be advantageous to have a method for producing an ablated wire that can be customised for different ablation requirements, while simultaneously being simple to perform. The requirement that the method be customisable is very important for the production of ablated wires with a very low product failure rate. The requirement that the method be customisable is further very important when the ablated wires are used as electrochemical sensors of medical measuring devices, in order to ensure that very high-precision measurements can be made. It is also highly advantageous that the method for producing the ablated wire does not damage the coated wire.

U.S. Pat. No. 6,509,547 B1 discloses a method for the removal of a protective coating that surrounds an optical fibre. U.S. Pat. No. 6,509,547 B1 removes the protective coating around the whole circumference of the coated wire. U.S. Pat. No. 6,509,547 B1 can therefore not be used to remove a coating layer partially around a circumference of a coated wire. U.S. Pat. No. 6,509,547 B1 can therefore also not be customised for different ablation requirements.

WO2020/098876 B1 discloses a device and method for removing coating layers from a coated wires and optical fibres using lasers. While WO2020/098876 B1 discloses that the lasers included in the device can be independently switched on or off, the lasers cannot be moved independently. WO2020/098876 B1 is also used to remove a coating layer around the whole circumference of the coated wire. WO2020/098876 B1 is therefore also not customisable for different laser ablation requirements.

CN201805182U discloses a device for removing a coating layers from coated wires using lasers. The device of CN201805182U includes lasers that cannot be moved. Furthermore, the coated wire is held in position by a plurality of clamps. CN201805182U is therefore also not customisable for different laser ablation requirements. Furthermore, CN201805182U leads to the production of a damaged, ablated wire due to the plurality of clamps holding the coated wire.

CN205355698U discloses a device for removing a coating layers from coated wires using lasers. The device of CN205355698U includes a different laser for each coating layer of the coated wire. While CN205355698U allows some flexibility in the coated wires that can be processed, the device of CN205355698U still has limitations. The lasers are arranged above the wire, and CN205355698U is therefore also not customisable for producing different ablation patterns.

For these and other reasons there is a need for the present invention.

SUMMARY

An object of one embodiment is to at least partially overcome at least one of the disadvantages encountered in the state of the art.

It is a further object of one embodiment to provide a method for producing ablated wires that is customisable to the ablation requirements, e.g., a broad variation of different ablation patterns, the thickness of the coating layers that are removed, and the number of coating layers that are removed.

It is a further object of one embodiment to provide a method for producing ablated wires that increases the production yield of ablated wires.

It is a further object of one embodiment to provide a method for producing ablated wires that is easy to set-up.

It is a further object of one embodiment to provide a method for producing ablated wires that reduces downtime, which increases the efficiency of the process and, thus, saves costs.

It is a further object of one embodiment to provide a method for producing ablated wires that reduces the damage of the coated wires used for producing the ablated wires.

It is a further object of one embodiment to provide a method for producing ablated wires that allows the use of curved, or less straight, coated wires.

It is a further object of one embodiment to provide a method for producing ablated wires that have a reduced product failure rate.

It is a further object of one embodiment to provide a method for producing ablated wires that have a higher measuring precision when used in medical devices, and in one embodiment as electrochemical sensors of medical measuring devices.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

The embodiments are now illustrated by non-limiting examples and exemplifying figures. The figures serve to exemplify the present embodiments, and should not be viewed as limiting the invention. Note that the figures are not drawn to scale.

LIST OF FIGURES

Figure 1A:
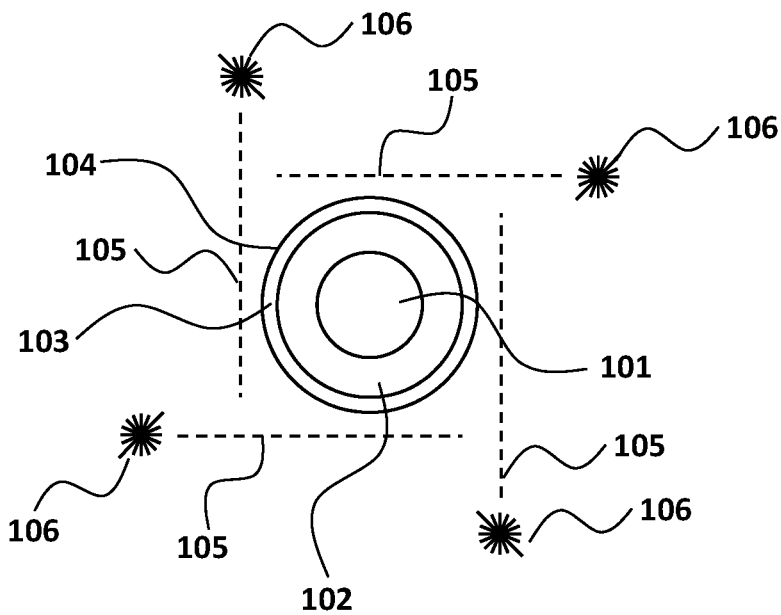
Figure 1B:
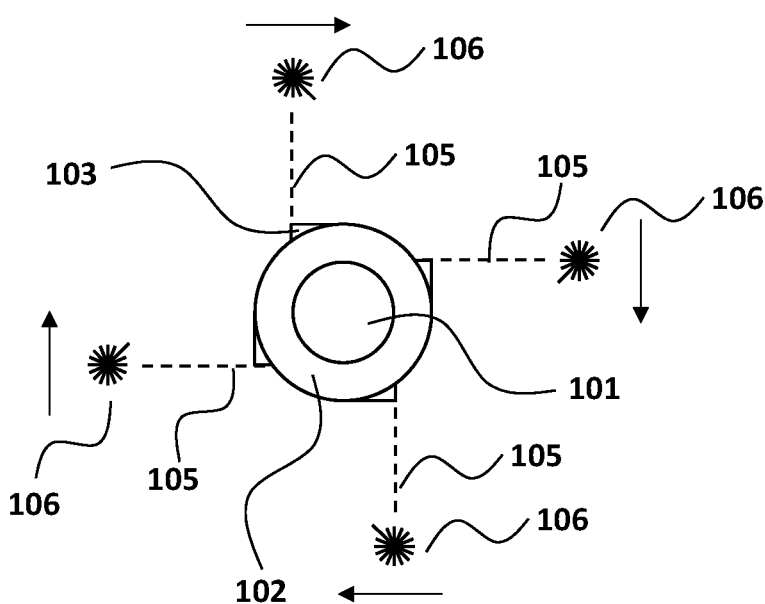
Figure 1C:
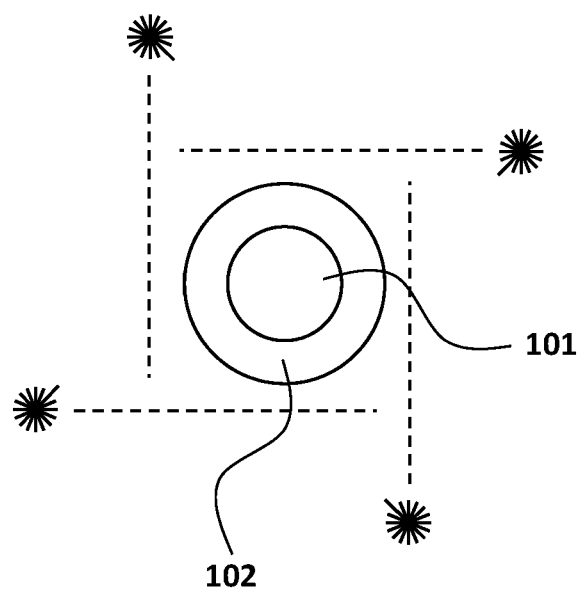

FIGS. 1A-1C illustrate a first example of the method for producing an ablated wire.

Figure 2:
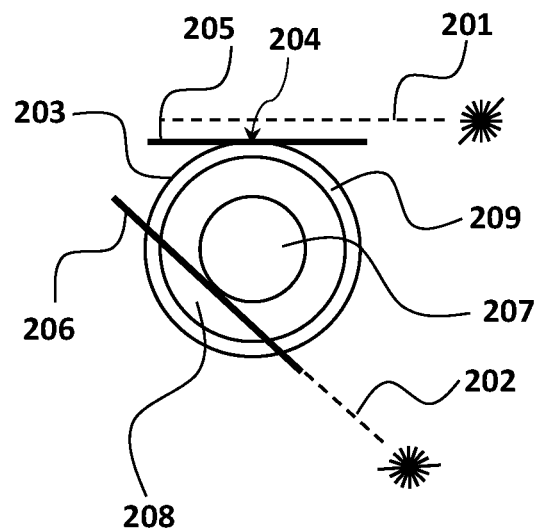

FIG. 2 illustrate examples of arranging the coated wire and the laser beams with respect to each other.

Figure 3:
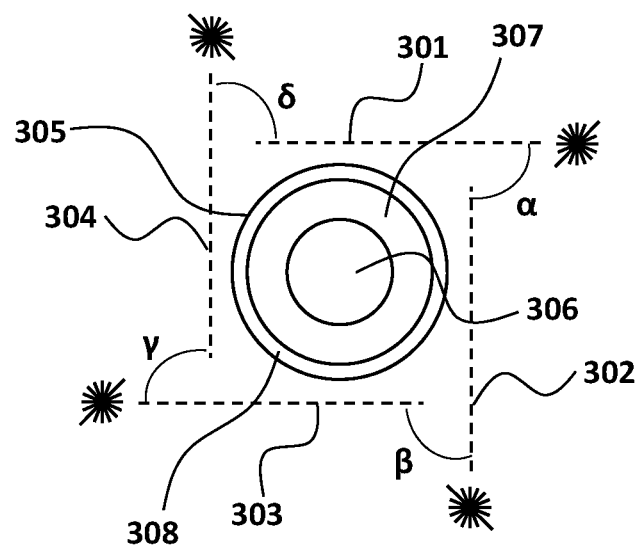

FIG. 3 illustrates the angles between neighbouring pairs of laser beams.

FIGS. 4A-4D illustrate a second example of the method for producing an ablated wire.

FIG. 5 illustrates a diagram of the processes included in the method for producing an ablated wire.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

EMBODIMENTS

A contribution to at least partially fulfilling at least one of the above-mentioned objects is made by the independent embodiments. The dependent embodiments provide embodiments which contribute to at least partially fulfilling at least one of the objects.

|1| Method for producing an ablated wire, including the steps of:

A.] providing a coated wire having a circumference and a length, and wherein the coated wire includes
  i. a core, and
  ii. an outermost coating layer, wherein the outermost coating layer at least partially surrounds the core,
  iii. an outer surface;
B.] providing a plurality of laser beams;
C.] arranging the coated wire and the plurality of laser beams with respect to each other, wherein at least two, in one embodiment at least three, and in one embodiment at least four of the plurality of laser beams are arranged at different angular positions with respect to the circumference of the coated wire;
D.] at least partially removing the outermost coating layer by moving at least one, in one embodiment at least two, in one embodiment at least three, and in one embodiment at least four of the plurality of laser beams with respect to the coated wire;
E.] obtaining the ablated wire;
wherein,
  at least two, in one embodiment at least three, and in one embodiment at least four of the plurality of laser beams are independent of each other.

In an aspect of embodiment |1|, it is preferred that the outer surface includes the sections of any coating layer that does not have another coating layer superimposed on the any coating layer. E.g., the coated wire includes a core and an outermost coating layer, wherein the outermost coating layer does not completely cover the core. i.e., sections of the core are exposed to the surrounding atmosphere. The outer surface therefore includes sections of the outermost coating layer, as well as sections of the core.

In an aspect of embodiment |1|, it is preferred that the outermost coating layer can be at least partially removed along either the length, or along the circumference, or both, of the coated wire. It is preferred to remove the outermost coating layer using ablation. Ablation is removal of material from the surface of an object by vaporisation, chipping, or other erosive processes. A preferred ablation is laser-ablation.

In an aspect of embodiment |1|, it is preferred that the coated wire further includes at least one intermediate coating layer. In this aspect it is more preferred that the at least one intermediate coating layer at least partially surrounds the core. It is further preferred that the outermost coating layer at least partially surrounds the at least one intermediate coating layer. It is also preferred that the at least one intermediate coating layer is at least partially removed by moving at least one, in one embodiment at least two, in one embodiment at least three, and in one embodiment at least four of the plurality of laser beams. It is further preferred that the at least one intermediate coating layer is at least partially removed along either the length, or along the circumference, or both, of the coated wire.

In step C.] of embodiment |1|, it is preferred that the "arranging" is such that either the plurality of laser beams, or the coated wire, or both, are positioned so that the plurality of laser beams do not touch the coated wire. The "arranging" can be achieved by e.g., by i.) either moving at least one, in one embodiment at least two, in one embodiment at least three, and in one embodiment at least four of the plurality of laser beams; or ii.) by moving the coated wire; or iii.) a combination of i.) and ii.).

In step C.] of embodiment |1|, it is preferred to use the following method for determining the angular position of a laser beam: an imaginary line is traced from a starting point on the outer surface of the coated wire to the laser beam, wherein the imaginary line is perpendicular to the outer surface at the starting point. The intersection point between the imaginary line and the laser beam is then used as the angular position. It is preferred in one embodiment that a different starting point is used for every laser beam. It this aspect is further preferred that the different starting points are chosen such that each imaginary line, corresponding to each laser beam, intersects only one laser beam.

In step D.] of embodiment |1|, it is preferred that the movement of at least one, in one embodiment at least two, even in one embodiment at least three, and in one embodiment at least four of the plurality of laser beams leads to the at least one, in one embodiment at least two, in one embodiment at least three, and in one embodiment at least four of the plurality of laser beams touching the coated wire. In this aspect it is preferred that at least two, in one embodiment at least three, and in one embodiment at least four of the plurality of laser beams touches the coated wire at least partially simultaneously, in one embodiment simultaneously.

In step D.] of embodiment |1|, it is preferred that the movement of at least one, in one embodiment at least two, in one embodiment at least three, and in one embodiment at least four of the plurality of laser beams include at least one or all of the following: a rotational movement around the circumference of the coated wire, a translation movement along the length of the coated wire, or a combination thereof.

In an aspect of embodiment |1|, it is preferred to repeat either step C.], or step D.], or both, at least once, in one embodiment multiple times. E.g., in a first execution of step C.], two laser beams are arranged at different angular positions with respect to the circumference of the coated wire, and at a first position along the length of the coated wire. In a first execution of step D.], a first section and a second section of the outermost coating layer is at least partially removed by moving two laser beams at different times. Step C.] is then repeated by arranging the two laser beams at different angular positions with respect to the circumference of the coated wire, and at a further position along the length of the coated wire. Step D.] is then repeated, wherein a third section and a fourth section of the outermost coating layer is at least partially removed by moving two laser beams at different times.

In embodiment |1|, the "independency" of the laser beams should in one embodiment be understood to mean at least one, in one embodiment all, of the following:
  I. the laser beams are produced by different lasers. This means that the laser beams are not produced by splitting a single laser beam through the use of an e.g., an optical means. In this aspect it is also preferred to use a combination of the following: i.) laser beams produced by different lasers, and ii.) laser beams produced by splitting at least one laser beam;
  II. the laser beams have different properties, e.g., different spot sizes.

In the above, all possible combination of the features I. and II. are preferred aspects of the embodiment. These combinations are e.g., I; II; I, II.

In an aspect of embodiment |1|, it is preferred to reduce the length of the coated wire after completing step D.]. In this aspect, if step D.] is to be repeated, it is more preferred to reduce the length of the coated wire after all repetitions of step D.] have been completed. It is also preferred to reduce the length of the ablated wire. The length of the coated wire can be reduced by e.g., cutting the coated wire using at least one or all of the following: a laser beam, a blade. The length of the ablated wire can be reduced by e.g., cutting the ablated wire using at least one or all of the following: a laser beam, a blade.

|2| The method according to embodiment |1|, wherein at least two, in one embodiment at least three, and in one embodiment at least four of the plurality of laser beams are produced by different lasers.

The "production of laser beams by different lasers" should be understood to mean that the laser beams are not produced by e.g., the splitting of a laser beam. In an aspect of embodiment |2|, it is preferred in one embodiment that all laser beams are produced by different lasers.

|3| The method according to any of the preceding embodiments, wherein the outermost coating layer is at least partially removed by moving at least two, in one embodiment at least three, and in one embodiment at least four of the plurality of laser beams with respect to the coated wire, and wherein the respective distances that the at least two, in one embodiment at least three, and in one embodiment at least four of the plurality of laser beams move differ by less than 10%, in one embodiment by less than 5%, and in one embodiment by less than 2% with respect to each other.

|4| The method according to any of the preceding embodiments, wherein at least one or all of the following applies:
  a. at least one of the plurality of laser beams are arranged parallel to an imaginary surface that is tangent to at least one point on the outer surface of the coated wire;
  b. at least one of the plurality of laser beams are arranged along an imaginary axis that passes though the coated wire.

For embodiment |4|, all possible combination of the features a. and b. are preferred aspects of the embodiment. These combinations are e.g., a; b; a, b.

|5| The method according to any of the preceding embodiments, wherein at least two, in one embodiment at least three, and in one embodiment at least four of the plurality of laser beams at least partially remove the outermost coating layer at non-overlapping sections.

In an aspect of embodiment |5|, it is preferred that the respective sizes of the non-overlapping sections vary by less than 10%, in one embodiment by less than 5%, and in one embodiment by less than 2% with respect to each other. In a further aspect of embodiment 151, it is preferred that the non-overlapping sections do not overlap either along the length of the coated wire, or along the circumference of the coated wire, or both.

|6| The method according to any of the preceding embodiments, wherein an angle between at least one pair, in one embodiment the respective angles between at least two pairs, and in one embodiment the respective angles between at least three pairs of neighbouring laser beams is in the range of 70° to 180°, in one embodiment in the range of 80° to 160°, and in one embodiment in the range of 90° to 150°. The value of 90° is preferred in one embodiment.

In embodiment |6|, a pair of laser beams are "neighbouring" if one traces an imaginary path around the circumference of the coated wire, from a first point on a first laser beam to a further point on a further laser beam, and the imaginary path does not cross another laser beam. Here the imaginary path should be traced parallel to the outer surface of the coated wire.

In an aspect of embodiment |6|, it is preferred that the respective angles between at least two pairs, in one embodiment at least three pairs, and in one embodiment at least four pairs of neighbouring laser beams differ by less than 10%, in one embodiment less than 5%, and in one embodiment by less than 2% with respect to each other.

|7| The method according to any of the preceding embodiments, wherein at least one or all of the following applies:
  a. at least two, in one embodiment at least three, and in one embodiment at least four of the plurality of laser beams are moved, with respect to the coated wire, at the same time;
  b. at least two, in one embodiment at least three, and in one embodiment at least four of the plurality of laser beams are moved, with respect to the coated wire, partially at the same time;
  c. at least two, in one embodiment at least three, and in one embodiment at least four of the plurality of laser beams are moved, with respect to the coated wire, at different times.

For embodiment |7|, all possible combination of the features a. to c. are preferred aspects of the embodiment. These combinations are e.g., a; b; c; a, b; a, c; b, c; a, b, c. It is also preferred that embodiment |7| applies to step D.] in embodiment |1|.

In embodiment |7|, if the laser beams move "at the same time", this should be understood to mean that the laser beams start moving at a time $t_1$. If the laser beams move "partially at the same time", this should be understood to mean that at least a first laser beam starts moving at a time $t_1$, and at least a further laser beam starts moving at a time $t_2$, wherein the first laser beam is still moving at the time $t_2$. If the laser beams move "at different times", this should be understood to mean that at least a first laser beam starts moving at a time $t_1$, and at least a further laser beam starts moving at a time $t_2$, wherein the first laser beam has stopped moving at the time $t_2$.

|8| The method according to any of the preceding embodiments, wherein at least one or all of the following applies:
  a. at least two, in one embodiment at least three, and in one embodiment at least four of the plurality of laser beams are arranged at different positions along the length of the coated wire;
  b. at least two, in one embodiment at least three, and in one embodiment at least four of the plurality of laser beams are arranged at respective distances from the circumference of the coated wire, wherein the respective distances differ by less than 10%, in one embodiment less than 5%, and in one embodiment by less than 2% with respect to each other;
  c. at least two, in one embodiment at least three, and in one embodiment at least four of the plurality of laser beams are arranged at different distances from the circumference of the coated wire.

For embodiment |8|, all possible combination of the features a. to c. are preferred aspects of the embodiment. These combinations are e.g., a; b; c; a, b; a, c; b, c; a, b, c. It is also preferred that embodiment |8| applies to step C.] in embodiment |1|.

|9| The method according to any of the preceding embodiments, wherein the coated wire is moved with respect to at least one of the plurality of laser beams, and wherein at least one or all of the following applies:
  a. at least one section of the coated wire is rotated by less than 5°, in one embodiment by less than 3°, and in one embodiment by less than 1°;
  b. at least one section of the coated wire is moved translationally by less than 1 cm, in one embodiment by less than 0.5 cm, and in one embodiment by less than 0.1 cm;
  c. at least one section of the coated wire is moved rotationally by less than 15°, in one embodiment by less than 10°, and in one embodiment by less than 5°.

For embodiment |9|, all possible combination of the features a. to c. are preferred aspects of the embodiment. These combinations are e.g., a; b; c; a, b; a, c; b, c; a, b, c. It is also preferred that embodiment |9| applies to step D.] in embodiment |1|. This should be understood to mean that when the outermost coating layer is removed by moving at least one, in one embodiment at least two, in one embodiment at least three, and in one embodiment at least four of the plurality of laser beams, it is preferred in one embodiment that the movement of the coated wire should be limited, as given in embodiment |9|.

In embodiment |9|, the phrase "at least one section of the coated wire is rotated" should be understood to mean the rotation of the at least one section of the coated wire around an imaginary axis that passes through the coated wire. In embodiment |9|, the phrase "at least one section of the coated wire is moved rotationally" should be understood to mean that the at least one section of the coated wire is moved, thereby tracing an imaginary path through space. E.g., a first end of the coated wire is held fixed, while the further end of the coated wire is moved along an imaginary, circular path.

|10| The method according to any of the preceding embodiments, wherein the coated wire has at least one or all of the following properties:
  a. a diameter in the range of 40 µm to 240 µm, in one embodiment in the range of 60 µm to 220 µm, and in one embodiment in the range of 80 µm to 200 µm;
  b. a length of at least 2000 m, in one embodiment at least 6000 m, and in one embodiment at least 10 000 m.

For embodiment |10|, all possible combination of the features a. and b. are preferred aspects of the embodiment. These combinations are e.g., a; b; a, b.

|11| The method according to any of the preceding embodiments, wherein the core of the coated wire has at least one or all of the following properties:
  a. includes one or more metals selected from the group consisting of gold, platinum, copper, silver, tantalum, and stainless steel, in one embodiment platinum clad tantalum;
  b. a diameter in the range of 40 µm to 160 µm, in one embodiment in the range of 60 µm to 140 µm, and in one embodiment in the range of 80 µm to 120 µm;
  c. an electrical conductivity in the range of $10^4$ S/m to $10^8$ S/m, in one embodiment in the range of $10^5$ S/m to $5 \times 10^7$ S/m, and in one embodiment in the range of $5 \times 10^5$ S/m to $2 \times 10^7$ S/m;
  d. a Young's modulus in the range of 10 GPa to 300 GPa, in one embodiment in the range of 70 GPa to 270 GPa, and in one embodiment in the range of 130 GPa to 240 GPa.

For embodiment |11|, all possible combination of the features a. to d. are preferred aspects of the embodiment. These combinations are e.g., a; b; c; d; a, b; a, c; a, d; b, c; b, d; c, d; a, b, c; a, b, d; a, c, d; b, c, d; a, b, c, d.

|12| The method according to any of the preceding embodiments, wherein the outermost coating layer of the coated wire has at least one or all of the following properties:

a. includes at least 10 wt. %, in one embodiment at least 25 wt. %, in one embodiment at least 50 wt. %, and particularly preferred at least 80 wt. %, based on the total weight of the outermost coating layer, of an organic material;
b. includes 50 wt. %, in one embodiment 60 wt. %, in one embodiment 70 wt. %, based on the total weight of the outermost coating layer, of a metal or a metal compound, or a combination thereof. A preferred metal is silver. A preferred metal compound is silver chloride;
c. a thickness in the range of 6 µm to 24 µm, in one embodiment in the range of 9 µm to 21 µm, and in one embodiment in the range of 12 µm to 18 µm;
d. an electrical conductivity in the range of $10^{-8}$ S/m to $2 \times 10^{-2}$ S/m, in one embodiment in 5 the range of $10^{-7}$ S/m to $10^{-3}$ S/m, and in one embodiment in the range of $5 \times 10^{-7}$ S/m to $2 \times 10^{-4}$ S/m;
e. a Young's modulus in the range of 0.01 MPa to 100 MPa, in one embodiment in the range of 0.025 MPa to 40 MPa, and in one embodiment in the range of 0.05 MPa to 20 MPa.

For embodiment |12|, all possible combination of the features a. to e. are preferred aspects of the embodiment. These combinations are e.g., a; b; c; d; e; a, b; a, c; a, d; a, e; b, c; b, d; b, e; c, d; c, e; d, e; a, b, c; a, b, d; a, b, e; a, c, d; a, c, e; a, d, e; b, c, d; b, c, e; b, d, e; c, d, e; a, b, c, d; a, b, c, e; a, b, d, e; a, c, d, e; b, c, d, e; a, b, c, d, e.

|13| The method according to the preceding embodiment |12|, wherein the organic material is a polymer selected form the group consisting of: I.) a mixture including an electrically insulating polymer and a plurality of particles that includes either a metal, or a metal compound, or a combination thereof, wherein the particles are in one embodiment powder or fibres, wherein the particles in one embodiment consist of one or more metals or metal compounds, in one embodiment a metal salt, in one embodiment a metal halide, and particular preferred a metal chloride, or a combination thereof, in one embodiment a combination of silver and silver chloride; II.) a conductive polymer; III.) a combination of I.) and II.).

|14| The method according to any of the preceding embodiments, wherein the coated wire includes at least one intermediate coating layer, and wherein at least one or all of the following applies:
a. the at least one intermediate coating layer at least partially surrounds the core;
b. the outermost coating layer at least partially surrounds the at least one intermediate coating layer.

For embodiment |14|, all possible combination of the features a. and b. are preferred aspects of the embodiment. These combinations are e.g., a; b; a, b.

|15| The method according to the preceding embodiment |14|, wherein the at least one intermediate coating layer has at least one or all of the following properties:
a. a thickness in the range of 10 µm to 40 µm, in one embodiment in the range of 15 µm to 35 µm, and in one embodiment in the range of 20 µm to 30 µm;
b. includes a polymer, in one embodiment polyurethane;
c. an electrical conductivity in the range of $10^{-21}$ S/m to $10^{-11}$ S/m, in one embodiment in the range of $10^{-20}$ S/m to $10^{-12}$ S/m, and in one embodiment in the range of $5 \times 10^{-20}$ S/m to $2 \times 10^{-13}$ S/m;
d. a Young's modulus in the range of 0.05 MPa to 5500 MPa, in one embodiment in the range of 0.1 MPa to 5000 MPa, and in one embodiment in the range of 0.5 MPa to 4500 MPa.

For embodiment |15|, all possible combination of the features a. to d. are preferred aspects of the embodiment. These combinations are e.g., a; b; c; d; a, b; a, c; a, d; b, c; b, d; c, d; a, b, c; a, b, d; a, c, d; b, c, d; a, b, c, d.

|16| The method according to any of the preceding embodiments, wherein at least one of the plurality of laser beams is a laser beam of the first kind, wherein a laser beam of the first kind has at least one or all of the following properties:
a. a pulse duration in the range of 10 fs to 500 ns, in one embodiment in the range of 50 fs to 400 ns, in one embodiment in the range of 100 fs to 300 ns, in one embodiment in the range of 500 fs to 200 ns, in one embodiment in the range of 1 ns to 100 ns, in one embodiment in the range of 10 ns to 100 ns, in one embodiment in the range of 15 ns to 80 ns;
b. a pulse frequency in the range of 5 kHz to 600 kHz, in one embodiment in the range of 10 kHz to 500 kHz, in one embodiment in the range of 20 kHz to 500 kHz, in one embodiment in the range of 30 kHz to 450 kHz, in one embodiment in the range of 40 kHz to 400 kHz, in one embodiment in the range of 50 kHz to 350 kHz, in one embodiment in the range of 80 kHz to 300 kHz, in one embodiment in the range of 90 kHz to 250 kHz, in one embodiment in the range of 100 kHz to 200 kHz, in one embodiment in the range of 110 kHz to 190 kHz;
c. an energy per pulse in the range of 2 µJ to 15 µJ, in one embodiment in the range of 2 µJ to 13 µJ, in one embodiment in the range of 3 µJ to 10 µJ, in one embodiment in the range of 4 µJ to 8 µJ;
d. has a spectrum with a peak wavelength in the range of 430 nm to 780 nm, in one embodiment in the range of 430 nm to 640 nm, in one embodiment in the range of 430 nm to 600 nm, in one embodiment in the range of 490 nm to 600 nm, in one embodiment in the range of 490 nm to 570 nm, in one embodiment in the range of 500 nm to 560 nm, in one embodiment in the range of 510 nm to 550 nm, in one embodiment in the range of 520 nm to 540 nm, in one embodiment in the range of 525 nm to 540 nm, in one embodiment in the range of 528 nm to 536 nm;
e. a fluence in the range of 1.0 J/cm$^2$ to 5.0 J/cm$^2$, in one embodiment in the range of 1.5 J/cm$^2$ to 4.5 J/cm$^2$, in one embodiment in the range of 2.0 J/cm$^2$ to 4.0 J/cm$^2$, in one embodiment in the range of 2.5 J/cm$^2$ to 3.8 J/cm$^2$;
f. a spot size in the range of 5 µm to 50 µm, in one embodiment in the range of 5 µm to 40 µm, in one embodiment in the range of 5 µm to 30 µm, and in one embodiment in the range of 10 µm to 20 µm.

For embodiment |16|, all possible combination of the features a. to f are preferred aspects of the embodiment. These combinations are e.g., a; b; c; d; e; f; a, b; a, c; a, d; a, e; a, f; b, c; b, d; b, e; b, f; c, d; c, e; c, f; d, e; d, f; e, f; a, b, c; a, b, d; a, b, e; a, b, f; a, c, d; a, c, e; a, c, f; a, d, e; a, d, f; a, e, f; b, c, d; b, c, e; b, c, f; b, d, e; b, d, f; b, e, f; c, d, e; c, d, f; c, e, f; d, e, f; a, b, c, d; a, b, c, e; a, b, c, f; a, b, d, e; a, b, d, f; a, b, e, f; a, c, d, e; a, c, d, f; a, c, e, f; a, d, e, f; b, c, d, e; b, c, d, f; b, c, e, f; b, d, e, f; c, d, e, f; a, b, c, d, e; a, b, c, d, f; a, b, c, e, f; a, b, d, e, f; a, c, d, e, f; b, c, d, e, f; a, b, c, d, e, f;

In an aspect of embodiment |16|, it is preferred that the spot size is the length of a diameter of the spot. It is also preferred that a spot is a focal spot. It is more preferred that the spot is about circular. In an aspect of embodiment |16|, it is preferred that the at least one laser beams is a pulsed laser beam. In this aspect, it is preferred that the fluence should be understood as the fluence per pulse.

|17| The method according to any of the preceding embodiments, wherein at least one of the plurality of laser beams is a laser beam of the further kind, wherein a laser beam of the further kind has at least one or all of the following properties:
  a. a pulse duration in the range of 10 fs to 500 ns, in one embodiment in the range of 50 fs to 400 ns, in one embodiment in the range of 100 fs to 300 ns, in one embodiment in the range of 500 fs to 200 ns, in one embodiment in the range of 1 ns to 100 ns, in one embodiment in the range of 1 ns to 50 ns, in one embodiment in the range of 5 ns to 30 ns, in one embodiment in the range of 10 ns to 20 ns;
  b. a pulse frequency in the range of 1 kHz to 100 kHz, in one embodiment in the range of 10 kHz to 80 kHz, in one embodiment in the range of 20 kHz to 60 kHz;
  c. an energy per pulse in the range of 1 µJ to 50 µJ, in one embodiment in the range of 5 µJ to 40 µJ, in one embodiment in the range of 10 µJ to 30 µJ, in one embodiment in the range of 10 µJ to 25 µJ, in one embodiment in the range of 10 µJ to 20 µJ, in one embodiment in the range of 12 µJ to 18 µJ, in one embodiment in the range of 14 to 16 µJ;
  d. has a spectrum with a peak wavelength in the range of 10 nm to 430 nm, in one embodiment in the range of 100 nm to 430 nm, in one embodiment in the range of 150 nm to 430 nm, in one embodiment in the range of 180 nm to 400 nm, in one embodiment in the range of 200 nm to 400 nm, in one embodiment in the range of 220 nm to 400 nm, in one embodiment in the range of 220 nm to 380 nm;
  e. a fluence in the range of 0.1 J/cm$^2$ to 50.0 J/cm$^2$, in one embodiment in the range of 0.2 J/cm$^2$ to 30.0 J/cm$^2$, in one embodiment in the range of 0.3 J/cm$^2$ to 20.0 J/cm$^2$;
  f. a spot size in the range of 2 µm to 50 µm, in one embodiment in the range of 2 µm to 40 µm, in one embodiment in the range of 5 µm to 30 µm, in one embodiment in the range of 5 µm to 20 µm, and in one embodiment in the range of 5 µm to 15 µm.

For embodiment |17|, all possible combination of the features a. to f are preferred aspects of the embodiment. These combinations are e.g., a; b; c; d; e; f; a, b; a, c; a, d; a, e; a, f; b, c; b, d; b, e; b, f; c, d; c, e; c, f; d, e; d, f; e, f; a, b, c; a, b, d; a, b, e; a, b, f; a, c, d; a, c, e; a, c, f; a, d, e; a, d, f; a, e, f; b, c, d; b, c, e; b, c, f; b, d, e; b, d, f; b, e, f; c, d, e; c, d, f; c, e, f; d, e, f; a, b, c, d; a, b, c, e; a, b, c, f; a, b, d, e; a, b, d, f; a, b, e, f; a, c, d, e; a, c, d, f; a, c, e, f; a, d, e, f; b, c, d, e; b, c, d, f; b, c, e, f; b, d, e, f; c, d, e, f; a, b, c, d, e; a, b, c, d, f; a, b, c, e, f; a, b, d, e, f; a, c, d, e, f; b, c, d, e, f; a, b, c, d, e, f;

In an aspect of embodiment |17|, it is preferred that the spot size is the length of a diameter of the spot. It is also preferred that a spot is a focal spot. It is more preferred that the spot is about circular. In an aspect of embodiment |17|, it is preferred that the at least one laser beam is a pulsed laser beam. In this aspect, it is preferred that the fluence should be understood as the fluence per pulse.

In an aspect of embodiment |17|, it is preferred in one embodiment that a laser beam of the further kind has a spectrum with a peak wavelength in the range of 220 nm to 280 nm, in one embodiment in the range of 230 nm to 260 nm; or in the range of 300 nm to 400 nm, in one embodiment in the range of 330 nm to 380 nm.

In an aspect of embodiment |17|, it is preferred that the fluence of a laser beam of the further kind is in the range of 0.1 J/cm$^2$ to 50.0 J/cm$^2$, in one embodiment in the range of 0.2 J/cm$^2$ to 30.0 J/cm$^2$. In another aspect of embodiment |17|, it is further preferred that the fluence of a laser beam of the further kind is in the range of 1 J/cm$^2$ to 20.0 J/cm$^2$, in one embodiment in the range of 11 J/cm$^2$ to 18 J/cm$^2$, in one embodiment in the range of 12.0 J/cm$^2$ to 17.0 J/cm$^2$.

|18| The method according to any of the preceding embodiments wherein at least one of the plurality of laser beams is obtainable from at least one solid-state laser.

In an aspect of embodiment |18|, a gain medium of the at least one solid-state laser is in one embodiment a crystal. In this aspect, a preferred crystal is doped with neodym. In this aspect, a preferred neodym-doped crystal includes yttrium. A preferred crystal which includes yttrium is selected from the group consisting of Nd:YAG, 15 Nd:Y3A15,012, and Nd:YVO4, with Nd:YVO4 is preferred in one embodiment.

|19| An ablated wire obtainable by the method according to any of the embodiments |1| to |18|, wherein the ablated wire includes
  a. a core, and
  b. an outermost coating layer that at least partially surrounding the core.

|20| The ablated wire according to embodiment |19|, wherein the ablated wire has at least one or all of the following properties:
  a. a diameter in the range of 40 µm to 240 µm, in one embodiment in the range of 60 µm to 220 µm, and in one embodiment in the range of 80 µm to 200 µm;
  b. a length of at least 2000 m, in one embodiment at least 6000 m, and in one embodiment at least 10 000 m.

For embodiment |20|, all possible combination of the features a. and b. are preferred aspects of the embodiment. These combinations are e.g., a; b; a, b.

|21| The ablated wire according to any of the embodiments |19| to |20|, wherein the core of the ablated wire has at least one or all of the following properties:
  a. includes one or more metals selected from the group consisting of gold, platinum, copper, silver, tantalum, and stainless steel, in one embodiment platinum clad tantalum;
  b. a diameter in the range of 40 µm to 160 µm, in one embodiment in the range of 60 µm to 140 µm, and in one embodiment in the range of 80 µm to 120 µm;
  c. an electrical conductivity in the range of $10^4$ S/m to $10^8$ S/m, in one embodiment in the range of $10^5$ S/m to $5 \times 10^7$ S/m, and in one embodiment in the range of $5 \times 10^5$ S/m to $2 \times 10^7$ S/m;
  d. a Young's modulus in the range of 10 GPa to 300 GPa, in one embodiment in the range of 70 GPa to 270 GPa, and in one embodiment in the range of 130 GPa to 240 GPa.

For embodiment |21|, all possible combination of the features a. to d. are preferred aspects of the embodiment. These combinations are e.g., a; b; c; d; a, b; a, c; a, d; b, c; b, d; c, d; a, b, c; a, b, d; a, c, d; b, c, d; a, b, c, d.

|22| The ablated wire according to any of the embodiments |19| to 121, wherein the outermost coating layer of the ablated wire has at least one or all of the following properties:

a. includes at least 10 wt. %, in one embodiment at least 25 wt. %, in one embodiment at least 50 wt. %, and particularly preferred at least 80 wt. %, based on the total weight of the outermost coating layer, of an organic material;
b. includes 50 wt. %, in one embodiment 60 wt. %, in one embodiment 70 wt. %, based on the total weight of the outermost coating layer, of a metal or a metal compound, or a combination thereof. A preferred metal is silver. A preferred metal compound is silver chloride;
c. a thickness in the range of 6 µm to 24 µm, in one embodiment in the range of 9 µm to 21 µm, and in one embodiment in the range of 12 µm to 18 µm;
d. an electrical conductivity in the range of $10^{-8}$ S/m to $2 \times 10^{-2}$ S/m, in one embodiment in 5 the range of $10^{-7}$ S/m to $10^{-3}$ S/m, and in one embodiment in the range of $5 \times 10^{-7}$ S/m to $2 \times 10^{-4}$ S/m;
e. a Young's modulus in the range of 0.01 MPa to 100 MPa, in one embodiment in the range of 0.025 MPa to 40 MPa, and in one embodiment in the range of 0.05 MPa to 20 MPa.

For embodiment |22|, all possible combination of the features a. to e. are preferred aspects of the embodiment. These combinations are e.g., a; b; c; d; e; a, b; a, c; a, d; a, e; b, c; b, d; b, e; c, d; c, e; d, e; a, b, c; a, b, d; a, b, e; a, c, d; a, c, e; a, d, e; b, c, d; b, c, e; b, d, e; c, d, e; a, b, c, d; a, b, c, e; a, b, d, e; a, c, d, e; b, c, d, e; a, b, c, d, e.

|23| The ablated wire according to the preceding embodiment |22|, wherein the organic material is a polymer selected form the group consisting of: I.) a mixture including an electrically insulating polymer and a plurality of particles that includes either a metal, or a metal compound, or a combination thereof, wherein the particles are in one embodiment powder or fibres, wherein the particles in one embodiment consist of one or more metals or metal compounds, in one embodiment a metal salt, in one embodiment a metal halide, and particular preferred a metal chloride, or a combination thereof, in one embodiment a combination of silver and silver chloride; II.) a conductive polymer; III.) a combination of I.) and II.).

|24| The ablated wire according to any of the embodiments |19| to |23|, wherein the ablated wire includes at least one intermediate coating layer, and wherein at least one or all of the following applies:
a. the at least one intermediate coating layer at least partially surrounds the core;
b. the outermost coating layer at least partially surrounds the at least one intermediate coating layer.

For embodiment |24|, all possible combination of the features a. and b. are preferred aspects of the embodiment. These combinations are e.g., a; b; a, b.

|25| The ablated wire according to the preceding embodiment |24|, wherein the at least one intermediate coating layer has at least one or all of the following properties:
a. a thickness in the range of 10 µm to 40 µm, in one embodiment in the range of 15 µm to 35 µm, and in one embodiment in the range of 20 µm to 30 µm;
b. includes a polymer, in one embodiment polyurethane;
c. an electrical conductivity in the range of $10^{-21}$ S/m to $10^{-11}$ S/m, in one embodiment in the range of $10^{-20}$ S/m to $10^{-12}$ S/m, and in one embodiment in the range of $5 \times 10^{-20}$ S/m to $2 \times 10^{-13}$ S/m;
d. a Young's modulus in the range of 0.05 MPa to 5500 MPa, in one embodiment in the range of 0.1 MPa to 5000 MPa, and in one embodiment in the range of 0.5 MPa to 4500 MPa.

For embodiment |25|, all possible combination of the features a. to d. are preferred aspects of the embodiment. These combinations are e.g., a; b; c; d; a, b; a, c; a, d; b, c; b, d; c, d; a, b, c; a, b, d; a, c, d; b, c, d; a, b, c, d.

|26| A use of the ablated wire according to any of the embodiments |19| to |25| in an electrical device, in one embodiment a medical device, in one embodiment a medical device used for measuring, and in one embodiment a medical device used for measuring blood glucose levels.

|27| A use of the ablated wire according to any of the embodiments |19| to |25| as a sensor, in one embodiment an electrochemical sensor, in one embodiment an electrochemical sensor for a medical device used for measuring, and in one embodiment an electrochemical sensor for a medical device used for measuring blood glucose levels.

Ablated Wire

In the context of the present embodiments, an ablated wire is defined as a product that is obtained once the method processes of the present embodiments, including the repetitions of any of the processes, have been completed.

Lasers

Lasers for producing the laser beams of the present embodiments are well-known to a person skilled in the art. Such laser are commercially available from e.g., Photonics Industries International, Inc (USA), or Trumpf GmbH and Co. KG (Germany).

Peak Wavelength

The peak wavelength of a spectrum is a local maximum, in one embodiment in addition a global maximum, of the spectrum. A preferred peak wavelength is a laser wavelength, i.e., a main wavelength of a laser output. The laser wavelength may be a lasing wavelength of a gain medium of the laser or a wavelength which is obtained by a non-linear optical effect, such as frequency doubling, from the lasing wavelength.

FIG. 1 is a schematic illustration illustrating a first example of the method for producing an ablated wire. FIG. 1A illustrates a cross-sectional cut of a coated wire and a plurality of laser beams 105. The coated wire has a core 101, an intermediate coating layer 102 that surrounds the core 101, and an outermost coating layer 103 that surrounds both the core 101 and the intermediate coating layer 102. The coated wire 101 also has an outer surface 104. FIG. 1A further illustrates four laser beams 105 arranged at different angular positions with respect to a circumference of the coated wire. Furthermore, the laser beams 105 are all arranged at the same position along a length of the coated wire (not illustrated in FIG. 1A). Each of the laser beams 105 is produced by a separate laser 106, i.e., the laser beams 105 are not produced by splitting a laser beam.

FIG. 1B illustrates the movement of the four lasers beams 105, resulting from the movement of the four lasers 106, with respect to the coated wire. The arrows in FIG. 1B indicate the direction of movement. As a result of the movement of the laser beams 106, the outermost coating layer 103 is removed around the circumference of the coated wire. The four laser beams 105 move independently from each other, nevertheless, the four laser beams 105 move at the same time. Furthermore, the four laser beams 105 all move the same distance. The four laser beams 105 also have the same properties. As a result, the laser beams 105 each remove a section of the outermost coating layer 105, wherein the respective sections have the same size, and do not overlap. Furthermore, each laser beam first touches the coated wire at a point where the outermost coating layer is present, while each laser beam stops touching the coated wire as soon as the laser beam touches a point where the intermediate coating layer has been exposed.

FIG. 1C illustrates the ablated wire that is obtained once the outermost coating layer has been removed around the circumference of the coated wire. The cross-sectional cut of the ablated wire illustrates that the ablated wire consists of only the core 101 and the intermediate coating layer 102. Note that the cross-sectional cut is made at a first position along the length of the ablated wire. If a cross-sectional cut were to be made at a further position along the length of the ablated wire, the ablated wire may consist of the core 101, any number of intermediate coating layers, and the outermost coating layer.

FIG. 2 is a schematic illustration illustrating examples of arranging the coated wire and the laser beams with respect to each other. A first example of arranging the laser beam and the coated wire with respect to each other is illustrated by laser beam 201. If an imaginary surface 205 where to be drawn tangent to the outer surface 203 of the coated wire, wherein the imaginary surface 205 passes through the point 204 located on the outer surface 203, then the laser beam 201 is parallel to the imaginary surface 205. A second example of arranging the laser beam and the coated wire with respect to each other is illustrated by laser beam 202. The laser beam 202 is arranged along an imaginary axis 206, wherein the imaginary axis 206 passes though the coated wire. The coated wire has a core 207, an intermediate coating layer 208 that surrounds the core 207, and an outermost coating layer 209 that surrounds both the core 207 and the intermediate coating layer 208.

FIG. 3 is a schematic illustration illustrating the angles between neighbouring pairs of laser beams. There are four neighbouring pairs of laser beams: the first neighbouring pair consists of laser beams 301 and 302 arranged at an angle α with respect to each other; the second neighbouring pair consists of laser beams 302 and 303 arranged at an angle b with respect to each other; the third neighbouring pair consists of laser beams 303 and 304 arranged at an angle g with respect to each other; and the fourth neighbouring pair consists of laser beams 304 and 301 arranged at an angle d with respect to each other. The coated wire has a core 306, an intermediate coating layer 307 that surrounds the core 306, and an outermost coating layer 308 that surrounds both the core 306 and the intermediate coating layer 307.

FIG. 4 is a schematic illustration illustrating a second example of the method for producing an abated wire. FIG. 4A illustrates a cross-sectional cut of a coated wire and two laser beams 406 and 408. The coated wire has a core 401, an intermediate coating layer 402 that surrounds the core 401, and an outermost coating layer 403 that surrounds both the core 401 and the intermediate coating layer 402. The coated wire 401 also has an outer surface 404. FIG. 4A further illustrates the two laser beams 406 and 408 arranged at different angular positions with respect to a circumference of the coated wire. Laser beam 406 is produced by laser 405, and laser beam 408 is produced by laser beam 407. FIG. 4B is the same as FIG. 4A, but here the coated wire is viewed from the side. It can be seen that the laser beams 406 and 408 are arranged at different positions along a length of the coated wire.

Figure 4A:
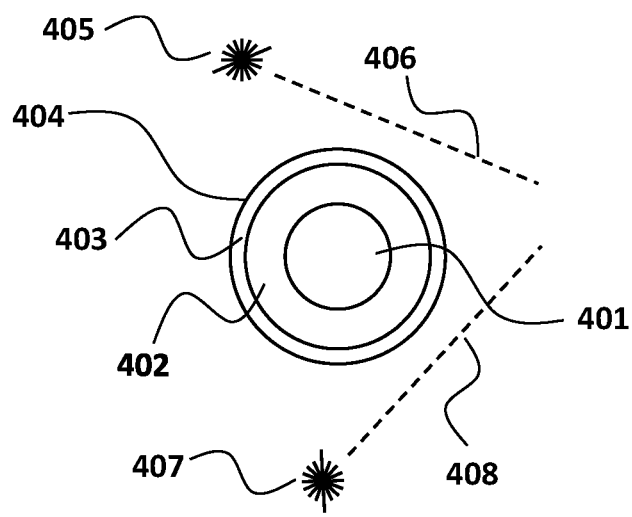
Figure 4B:
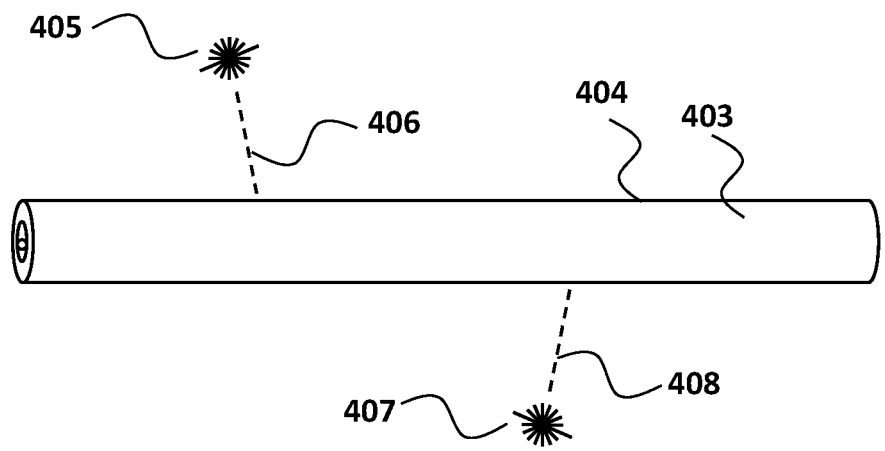
Figure 4C:
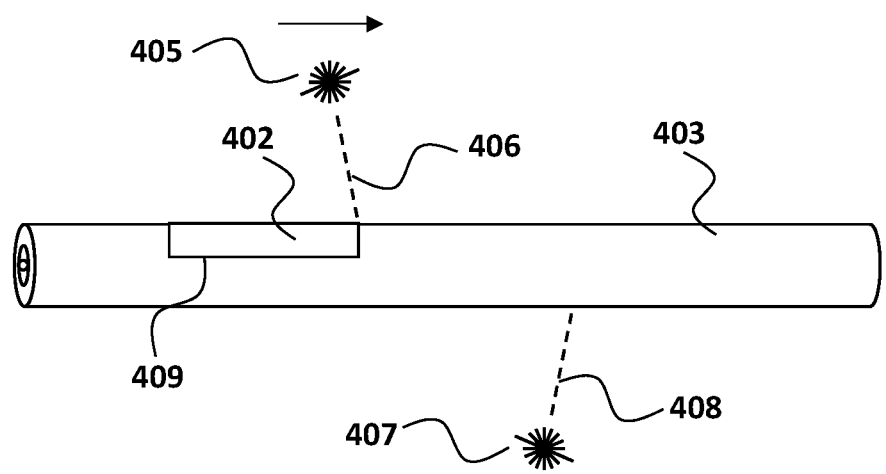

In FIG. 4C the laser beam 406 was first moved so that the laser beam touches the outermost coating layer 403, followed by moving the laser beam 406 along the direction indicated by the arrow. This results in the removal of a first section 409 of the outermost coating layer 403, thereby exposing the intermediate coating layer 402 in the first section 409. Once the removal of the first section 409 is completed, the laser beam 406 is moved so that the laser beam does not touch the coated wire.

Figure 4D:
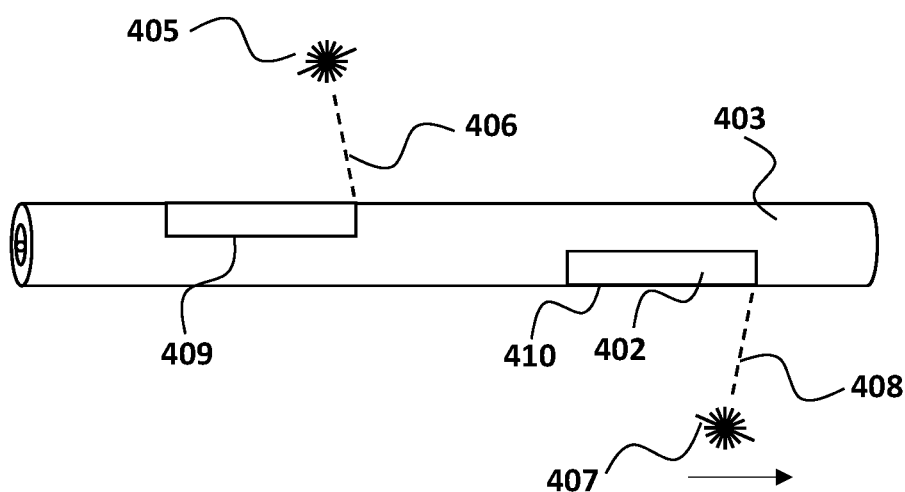

In FIG. 4D the laser beam 408 was first moved so that the laser beam touches the outermost coating layer 403, followed by moving the laser beam 408 along the direction indicated by the arrow. The movement of the laser beam 408 started after the movement of the laser beam 406 was stopped. The movement of the laser beam 408 results in the removal of a second section 410 of the outermost coating layer, thereby exposing the intermediate coating layer 402 in the second section 410. Once the removal of the second section 410 is completed, the laser beam 408 is moved so that the laser beam does not touch the coated wire.

FIGS. 4C and 4D illustrate that the sections 409 and 410 do not extend around the entire circumference of the coated wire. Furthermore, the sections 409 and 410 have the same size. However, this is not a requirement of the present embodiment. In this example, the ablated wire is defined as the coated wire with the outermost coating layer removed in sections 409 and 410.

FIG. 5 is a diagram illustrating the processes included in the method for producing an ablated wire. In process 501, a coated wire including a core and an outermost coating layer is provided. In step 502, a plurality of laser beams is provided. In step 503, the coated wire and the plurality of laser beams are arranged with respect to each other. In step 504, the outermost coating layer is removed by moving at least one laser beams with respect to the coated wire. In step 505, an ablated wire is obtained. FIG. 5 also illustrates that prior to obtaining the ablated wire in step 505, step 503 can be optionally repeated. Furthermore, step 504 can also be optionally repeated. Although FIG. 5 illustrates one repetition of processes 503 and 504, these steps can be repeated any number of times.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

Test Methods

The test methods which follow were utilized within the context of the embodiments. Unless stated otherwise, the measurements were conducted at an ambient temperature of 23° C., an ambient air pressure of 100 kPa (0.986 atm) and a relative air humidity of 50%.

Spectrum and Peak Wavelength

In case of a laser beam as beam of electromagnetic radiation, the peak wavelength of the spectrum is the nominal peak wavelength of the laser output. This is either the wavelength at which the laser, which produces the laser beam, lases or, if a non-linear optical process is used to alter the output wavelength, the respective harmonic of the lasing wavelength. For example, a KrF-Excimer laser typically has a lasing wavelength at about 248 nm. A Nd:YVO4-laser typically has a lasing wavelength at about 1064 nm. If the light of the Nd:YVO4-laser is frequency doubled, the peak wavelength of the laser output is at about 532 nm. If the beam of electromagnetic radiation is not a laser beam, the spectrum of this electromagnetic radiation is measured using a spectrometer of the type CCS200 from Thorlabs GmbH. The measurement is conducted in accordance with the manufacturer's instructions. The peak wavelength of the measured spectrum is then a local maximum of the spectrum which is also its global maximum.

Pulse Frequency

The pulse frequency is defined as the number of pulses, emitted per unit of time. The pulse frequency of a pulsed laser beam is adjusted at the laser producing the laser beam. Any pulse frequency, referred to herein, means the pulse frequency as adjusted at the laser producing the laser beam.

Pulse Duration

The pulse duration is defined as the time duration between the intensity levels of a pulse measured at FWHM (full width at half-maximum). It is measured with a suitable photo diode and an oscilloscope.

Fluence

The fluence is defined as energy per pulse [J]/effective focal spot area [cm$^2$]. Therein, the effective focal spot area is calculated as the area of a circle of a diameter which is the spot size according to the test method below.

Energy Per Pulse

The energy per pulse is determined by first measuring the accumulated energy of the laser beam over a period of irradiation of 1 second using a thermal power meter. If the focus of the laser beam is on the workpiece, this energy is measured right in front of the workpiece, i.e., slightly out of the focus point. The pulse frequency is determined as described above. The energy per pulse is calculated by dividing the accumulated energy by the pulse frequency in Hz.

Spot Size

The 2D-intensity distribution of the spot is measured using a 2D power meter. The spot size is determined by fitting a circle to the Full Width at Half Maximum of the 2D-intensity distribution. The spot size is the diameter of this circle.

Weight Percentage

This is determined by quantitative analytical methods. E.g., gas chromatography, gravimetry, elementary analysis or the like.

Electrical Conductivity

Electrical conductivity is measured according to the standard ASTM B193-16.

Young's Modulus

Young's modulus is measured according to the standard ASTM E111-17.

EXAMPLES

The embodiments are illustrated further by way of examples. The invention is not restricted to the examples.

Example 1

A coated wire with a thickness of 180 µm is provided. The coated wire has a core that consists of platinum clad tantalum. The thickness of the core is 100 µm. An intermediate coating layer of polyurethane surrounds the core, wherein the thickness of the intermediate coating layer is 25 µm. The intermediate coating layer is surrounded by a 15 µm thick outermost coating layer. The outermost coating layer includes polyurethane, silver and silver chloride.

Four laser beams, each produced by a different laser, is provided, wherein the four lasers have the same properties. Each laser is a pulsed, Nd:YVO4-laser having a peak output wavelength at 532 nm. This output wavelength is obtained by frequency doubling the lasing wavelength of about 1064 nm of the Nd:YVO4-crystal. The laser beams are pulsed at a frequency of 160 kHz, wherein each pulse has an energy of 5 µJ and a duration of about 60 ns. The laser beams are focused down to a focal beam diameter of 15 µm. Each pulse of a laser beam has a fluence of 2.8 J/cm$^2$.

The four laser beams and the coated wire are arranged with respect to each other, as illustrated in FIG. 1A. The example is further performed as described in FIGS. 1A to 1C. It is advantageous to have the laser beams move, instead of the coated wire. Moving the coated wire, which can include a rotation, can lead to torsion in the coated wire, which in turn can lead to damaging the wire. Moving the laser beams instead of the coated wire has the further advantage that the coated wire does not have to be straight. A further advantage of moving the lasers as described in FIGS. 1A to 1C is that, e.g., the outermost coating layer can be precisely removed without damaging the intermediate coating layer.

Example 2

Example 1 is compared to the following method for producing an ablated wire: a coated wire, similar to the coated wire of Example 1, is provided. Two lasers, similar to the lasers of Example 1, is provided. However, in contrast to Example 1, the laser beam of each laser is split, thereby obtaining four laser beams in total. A number of mirrors are further used to direct the laser beams. Further in contrast to Example 1, the outermost coating layer is removed by rotating the coated wire around an imaginary axis that passes through the centre of the coated wire.

Table 1 illustrates a comparison of Example 1 and Example 2. From the table it follows that the present embodiment has numerous advantages over the comparative example.

|  | Present embodiment (Example 1) | Comparative (Example 2) |
| --- | --- | --- |
| Customisable for different ablation requirements | Yes | No |
| Set-up | Simple | Complex |
| Downtime | Very low | Moderate |
| Production yield | High | Moderate |
| Number of ablated wires damaged | Extremely low | Low |
| Straightening of wires required | No | Yes |
| Product failure rate | Very low | Low |
| Measuring precision | Extremely high | Very High |

With regards to Table 1:

Customisable for different ablation requirements: whether the method for producing the ablated wire can be customised for different ablation requirements, e.g., different ablation patterns, the thickness of the coating layers that are removed, and the number of coating layers that are removed.
Set-up: how difficult it is to set-up the method, including the time and costs it takes to set-up the production method.
Downtime: the time required to customise the method for a different ablation requirement. e.g., exchanging a laser beam of the first kind for a laser beam of the further kind.
Production yield: the production yield of ablated wires.
Number of ablated wires damaged: the production method can lead to the damage of the coated wires, and consequently the ablated wires. Damage includes, e.g, scratches in the at least one outermost coating layer, and broken coated wires.
Straightening of wires required: whether it is necessary for the coated wire to be straightened, i.e., whether the curvature of the coated wire has to be reduced in order to use the coated wire in the production method. If the coated wire needs to be straightened, this involves and additional process in the production method wherein in the coated wire is straightened. This most often leads to damage of the coated wire, as well as increased costs.

| | Present embodiment (Example 1) | Comparative (Example 2) |
|---|---|---|

Product failure rate: the number of ablated wires that fail quality control tests. These tests include, e.g., test of the conductivity of the different layers of the ablated wire.
Measuring precision: the accuracy of the measurements when the ablated wires, or further products obtained from the ablated wires, are used as electrochemical sensors.

The invention claimed is:

1. A method for producing an ablated wire, comprising:
   A.] providing a coated wire having a circumference and a length, and wherein the coated wire comprises
      i. a core,
      ii. an outermost coating layer, wherein the outermost coating layer at least partially surrounds the core, and
      iii. an outer surface;
   B.] providing a plurality of laser beams;
   C.] arranging the coated wire and the plurality of laser beams with respect to each other, wherein at least two of the plurality of laser beams are arranged at different angular positions with respect to the circumference of the coated wire and wherein an angle between at least one pair of neighboring laser beams is in the range of 70° to 160°;
   D.] at least partially removing the outermost coating layer by moving the plurality of laser beams with respect to the coated wire;
   E.] obtaining the ablated wire;
   wherein,
   the plurality of laser beams are independent of each other, and
   wherein one of the following applies:
   a. the plurality of laser beams are laser beams of the first kind having a spectrum with a peak wavelength in range of 430 nm to 780 nm, or
   b. the plurality of laser beams are laser beams of the further kind having a spectrum with a peak wavelength in the range of 10 nm to 430 nm.

2. The method according to claim 1, wherein at least two of the plurality of laser beams are produced by different lasers.

3. The method according to claim 1, wherein the outermost coating layer is at least partially removed by moving at least two of the plurality of laser beams with respect to the coated wire, and wherein the respective distances that the at least two of the plurality of laser beams move differ by less than 10% with respect to each other.

4. The method according to claim 1, wherein at least one of the following applies:
   a. at least one of the plurality of laser beams are arranged parallel to an imaginary surface that is tangent to at least one point on the outer surface of the coated wire;
   b. at least one of the plurality of laser beams are arranged along an imaginary axis that passes though the coated wire.

5. The method according to claim 1, wherein at least two of the plurality of laser beams at least partially remove the outermost coating layer at non-overlapping sections.

6. The method according to claim 1, wherein at least one of the following applies:
   a. at least two of the plurality of laser beams are moved, with respect to the coated wire, at the same time;
   b. at least two of the plurality of laser beams are moved, with respect to the coated wire, partially at the same time;
   c. at least two of the plurality of laser beams are moved, with respect to the coated wire, at different times.

7. The method according to claim 1, wherein at least one of the following applies:
   a. at least two of the plurality of laser beams are arranged at different positions along the length of the coated wire;
   b. at least two of the plurality of laser beams are arranged at respective distances from the circumference of the coated wire, wherein the respective distances differ by less than 10% with respect to each other;
   c. at least two of the plurality of laser beams are arranged at different distance from the circumference of the coated wire.

8. The method according to claim 1, wherein the coated wire is moved with respect to at least one of the plurality of laser beams, and wherein at least one of the following applies:
   a. at least one section of the coated wire is rotated by less than 5°;
   b. at least one section of the coated wire is moved translationally by less than 1 cm;
   c. at least one section of the coated wire is moved rotationally by less than 15°.

9. The method according to claim 1, wherein the coated wire has at least one of the following properties:
   a. a diameter in the range of 40 µm to 240 µm;
   b. a length of at least 2000 m.

10. The method according to claim 1, wherein the core of the coated wire has at least one of the following properties:
    a. comprises one or more metals selected from the group consisting of gold, platinum, copper, silver, tantalum, and stainless steel;
    b. a diameter in the range of 40 µm to 160 µm;
    c. an electrical conductivity in the range of $10^4$ S/m to $10^8$ S/m;
    d. a Young's modulus in the range of 10 GPa to 300 GPa.

11. The method according to claim 1, wherein the outermost coating layer of the coated wire has at least one of the following properties:
    a. comprises at least 10 wt. %, based on the total weight of the outermost coating layer, of an organic material;
    b. comprises 50 wt. %, based on the total weight of the outermost coating layer, of a metal or a metal compound, or a combination thereof;
    c. a thickness in the range of 6 µm to 24 µm;
    d. an electrical conductivity in the range of $10^{-8}$ S/m to $2 \times 10^{-2}$ S/m;
    e. a Young's modulus in the range of 0.01 MPa to 100 MPa.

12. The method according to claim 11, wherein the organic material is a polymer selected form the group consisting of: I.) a mixture comprising an electrically insulating polymer and a plurality of particles that comprises either a metal, or a metal compound, or a combination thereof; II.) a conductive polymer; III.) a combination of I.) and II.).

13. The method according to claim 1, wherein the coated wire comprises at least one intermediate coating layer, and wherein at least one of the following applies:
    a. the at least one intermediate coating layer at least partially surrounds the core;
    b. the outermost coating layer at least partially surrounds the at least one intermediate coating layer.

14. The method according to claim 13, wherein the at least one intermediate coating layer has at least one of the following properties:

a. a thickness in the range of 10 µm to 40 µm;
 b. comprises a polymer;
 c. an electrical conductivity in the range of $10^{-21}$ S/m to $10^{-11}$ S/m;
 d. a Young's modulus in the range of 0.05 MPa to 5500 MPa.

15. The method according to claim 1, wherein at least one of the plurality of laser beams is a laser beam of the first kind, wherein a laser beam of the first kind has at least one of the following properties:
 a. a pulse duration in the range of 10 fs to 500 ns;
 b. a pulse frequency in the range of 5 kHz to 600 kHz;
 c. an energy per pulse in the range of 2 µJ to 15 µJ;
 d. a fluence in the range of 1.0 J/cm$^2$ to 5.0 J/cm$^2$;
 e. a spot size in the range of 5 µm to 50 µm.

16. The method according to claim 1, wherein at least one of the plurality of laser beams is a laser beam of the further kind, wherein a laser beam of the further kind has at least one of the following properties:
 a. a pulse duration in the range of 10 fs to 500 ns;
 b. a pulse frequency in the range of 1 kHz to 100 kHz;
 c. an energy per pulse in the range of 1 µJ to 50 µJ;
 d. a fluence in the range of 0.1 J/cm$^2$ to 50.0 J/cm$^2$;
 e. a spot size in the range of 2 µm to 50 µm.

17. An ablated wire obtained by the method according to claim 1, wherein the ablated wire comprises
 a. a core, and
 b. an outermost coating layer that at least partially surrounding the core.

18. A use of the ablated wire according to claim 17 in an electrical device.

19. A use of the ablated wire according to claim 17 as a sensor.

* * * * *